(12) United States Patent
Williams et al.

(10) Patent No.: US 10,295,026 B2
(45) Date of Patent: May 21, 2019

(54) BELT DRIVE SYSTEM

(71) Applicant: AGCO Corporation, Duluth, GA (US)

(72) Inventors: Nicholas H. Williams, Hesston, KS (US); Andrew Mark Veer, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 0 days.

(21) Appl. No.: 15/741,735

(22) PCT Filed: Jun. 27, 2016

(86) PCT No.: PCT/IB2016/000889
§ 371 (c)(1),
(2) Date: Jan. 3, 2018

(87) PCT Pub. No.: WO2017/006161
PCT Pub. Date: Jan. 12, 2017

(65) Prior Publication Data
US 2018/0195585 A1 Jul. 12, 2018

Related U.S. Application Data

(60) Provisional application No. 62/190,138, filed on Jul. 8, 2015.

(51) Int. Cl.
*F16H 7/02* (2006.01)
*F16H 7/12* (2006.01)
(Continued)

(52) U.S. Cl.
CPC ............... *F16H 9/04* (2013.01); *A01D 69/06* (2013.01); *F16D 11/14* (2013.01); *F16D 21/04* (2013.01); *F16H 7/02* (2013.01); *F16H 7/12* (2013.01)

(58) Field of Classification Search
CPC .... B23Q 5/00; E21B 3/06; F16H 9/04; A01D 69/08; Y10T 74/19456
(Continued)

(56) References Cited

U.S. PATENT DOCUMENTS 443,938 A * 12/1890 Fleming ................. B62M 25/08
280/238
449,581 A * 3/1891 Evans ........................ E21B 3/06
474/73
(Continued)

FOREIGN PATENT DOCUMENTS

EP        2798944 A2    11/2014
GB        1566976 A     5/1980
WO     01/31218 A1     5/2001

OTHER PUBLICATIONS

UK Intellectual Property Office, International Search Report for related UK Application No. GB1513499.2, dated Jan. 28, 2016.
(Continued)

*Primary Examiner* — Henry Y Liu

(57) ABSTRACT

A belt drive system for a vehicle, such as a combine harvester. The belt drive system uses a driven pulley which is selectively engageable with a driven shaft to supply rotation to the shaft. The pulley is mounted on a fixed, i.e. non-rotating, housing using suitable bearings, such that the bearings of the pulley continue to rotate and are dynamically loaded for all rotation conditions of the driven pulley, i.e. whether the pulley is engaged with the shaft or not. This prevents damage to the bearings due to false brinelling.

12 Claims, 5 Drawing Sheets

(51) Int. Cl.
*F16H 9/04* (2006.01)
*A01D 69/06* (2006.01)
*F16D 11/14* (2006.01)
*F16D 21/04* (2006.01)

(58) Field of Classification Search
USPC .................................................. 474/73, 76
See application file for complete search history.

(56) References Cited

U.S. PATENT DOCUMENTS

| | | | | |
|---|---|---|---|---|
| 453,540 A | * | 6/1891 | Bigelow | E21B 3/06 474/73 |
| 461,699 A | * | 10/1891 | Anthony et al. | B62M 25/08 280/238 |
| 463,302 A | * | 11/1891 | Decker | E21B 3/06 474/73 |
| 498,172 A | * | 5/1893 | Kortright et al. | B23Q 5/00 474/76 |
| 501,054 A | * | 7/1893 | Carns | B23Q 5/00 474/76 |
| 510,227 A | * | 12/1893 | Acklin | B62M 25/08 280/238 |
| 514,782 A | * | 2/1894 | Sherwood | E21B 3/06 474/73 |
| 525,724 A | * | 9/1894 | Scott | B23Q 5/00 474/76 |
| 528,956 A | * | 11/1894 | Lippy et al. | B62M 25/08 280/238 |
| 546,703 A | * | 9/1895 | Lippy et al. | B23Q 5/00 474/76 |
| 561,146 A | * | 6/1896 | Tullius | E21B 3/06 474/73 |
| 575,725 A | * | 1/1897 | Meister | B62M 25/08 280/238 |
| 580,007 A | * | 4/1897 | Schweers | B23Q 5/00 474/76 |
| 601,574 A | * | 3/1898 | Luther | B23Q 5/00 474/76 |
| 625,111 A | * | 5/1899 | Lane et al. | B23Q 5/00 474/76 |
| 628,585 A | * | 7/1899 | Lane et al. | B23Q 5/00 474/76 |
| 635,823 A | * | 10/1899 | Valade | B23Q 5/00 474/76 |
| 644,411 A | * | 2/1900 | Deafenbaugh | E21B 3/06 280/238 |
| 721,739 A | * | 3/1903 | Porter | B23Q 5/00 180/219 |
| 733,193 A | * | 7/1903 | Hain | F16H 3/093 192/21 |
| 784,973 A | * | 3/1905 | Bentley | E21B 3/06 474/73 |
| 1,032,245 A | * | 7/1912 | Smith | E21B 3/06 474/73 |
| 1,143,048 A | * | 6/1915 | Hunt | F16H 15/10 474/73 |
| 1,909,522 A | * | 5/1933 | Collins | B23Q 5/00 474/76 |
| 2,193,289 A | * | 3/1940 | Macblane | B62M 9/04 474/76 |
| 2,474,789 A | * | 6/1949 | Perhacs | F16D 21/04 192/44 |
| 2,541,872 A | * | 2/1951 | Hendricks | B62M 9/04 192/145 |
| 2,713,405 A | * | 7/1955 | Mathews | F16D 21/04 192/48.8 |
| 2,916,924 A | * | 12/1959 | Gray | F16H 61/66245 192/105 B |
| 3,017,977 A | * | 1/1962 | Settimi | F16D 45/00 192/103 A |
| 3,318,408 A | * | 5/1967 | Hopkins | B62M 25/00 180/222 |
| RE26,608 E | * | 6/1969 | Hopkins | B62M 11/06 180/227 |
| 3,798,986 A | * | 3/1974 | Clark | B62K 23/06 474/73 |
| 4,158,316 A | * | 6/1979 | Strong | F16H 9/24 192/48.91 |
| 5,690,568 A | * | 11/1997 | Watson | B22F 7/062 474/152 |
| 5,871,412 A | * | 2/1999 | Moser | F16H 9/04 474/76 |
| 6,773,367 B2 | * | 8/2004 | Laufenberg | A01D 69/08 474/58 |
| 6,929,574 B2 | * | 8/2005 | Laufenberg | A01D 69/08 474/70 |
| 7,867,119 B2 | * | 1/2011 | Brunetiere | B60K 6/383 192/48.2 |
| 8,272,982 B2 | * | 9/2012 | Fitz | F16H 55/36 464/37 |
| 9,107,345 B2 | * | 8/2015 | Patterson | A01F 12/58 |
| 9,169,904 B2 | * | 10/2015 | Graves | B60K 25/02 |
| 9,556,938 B2 | * | 1/2017 | Murray | A01D 69/08 |
| 2004/0009834 A1 | * | 1/2004 | Laufenberg | A01D 69/08 474/73 |
| 2010/0009796 A1 | * | 1/2010 | Fitz | F16H 55/36 474/197 |
| 2013/0210506 A1 | * | 8/2013 | Hollatz | A01D 69/08 460/112 |
| 2014/0148286 A1 | * | 5/2014 | Murray | A01D 69/08 474/76 |

OTHER PUBLICATIONS

European Patent Office, International Search Report for parent International Application No. PCT/IB2016/000889, dated Oct. 13, 2016.

* cited by examiner

BELT DRIVE SYSTEM

BACKGROUND OF THE INVENTION

Field of the Invention

The present invention relates to a belt drive system for a vehicle, in particular a selectable belt drive system for an agricultural vehicle such as a harvester.

Description of Related Art

Belt drive systems are often used in vehicles such as combine harvesters to provide rotating motion to vehicle components. Such systems generally comprise a rotating driver pulley connected to a driven pulley via a belt. The driven pulley may be connected to the component to be rotated via a shaft or similar element.

It is common for combine harvesters to include driven systems which require a change in operating speed for improved material handling, performance, or efficiency. Many manufacturers have implemented two-speed belt drives to meet this requirement as an economical alternative to multi-ratio gearboxes. These drives are comprised of two driver and driven pulleys with either end, driver or driven, fixed upon a shaft and the opposite mounted upon supporting bearings. These pulleys are connected by belts which are tensioned in a normal manner to deliver two different effective ratios or speeds at the driven end. The two individual driven pulleys may be selectively engaged with the corresponding shaft by a shift collar, to transmit the desired output ratio/speed at the driven shaft. An example of such a shiftable two-speed belt drive system can be seen in U.S. Pat. No. 6,773,367.

A problem with such prior art systems is that when a driven pulley is engaged to rotate the driven shaft, the bearings which support the driven pulley and/or driven shaft are statically loaded when supporting the maximum loads induced by the drive belt. That is, when the pulley is engaged to rotate the shaft, the bearings at the interface between the shaft and the pulley do not rotate, and are held in a stationary position. This then causes the rolling elements (e.g. balls, rollers, etc.) within the bearings to undergo repeated loading while stationary, which can lead to false brinelling of the concerned elements. Such false brinelling of bearing systems can result in premature failure of the supporting bearings, requiring costly service and repair of the belt drive system.

It is an object of the invention to provide a belt drive system which addresses the above issue.

SUMMARY OF THE INVENTION

Accordingly, there is provided a belt drive system for a vehicle, the belt drive system comprising:
at least one pulley;
a shaft rotatable about an axis; and
a shift collar provided on said shaft to selectively engage with said at least one pulley, such that said at least one pulley is drivably engaged with said shaft,
wherein the belt drive system further comprises a fixed housing, wherein said at least one pulley is rotatably provided on said fixed housing.

As the pulley is provided on the fixed housing, the pulley will rotate relative to the housing regardless of the engagement status of the pulley with the shaft. Accordingly, the interface between the pulley and the housing experiences dynamic loading for all rotating conditions of the pulley—the bearings supporting each pulley continue to turn when selectively engaged with the shaft. This prevents damage or failure at the interface due to static loading of the interface of the pulley, e.g. due to false brinelling, leading to improved bearing longevity.

In a preferred embodiment, there is provided a belt drive system for a vehicle, the belt drive system comprising:
at least one driven pulley;
an output shaft rotatable about an axis; and
a shift collar provided on said output shaft to selectively engage with said at least one driven pulley to drive said output shaft,
wherein the belt drive system further comprises a fixed housing, wherein said at least one driven pulley is rotatably provided on said fixed housing.

Additionally or alternatively, there is provided a belt drive system for a vehicle, the belt drive system comprising:
at least one driver pulley;
an input shaft rotatable about an axis; and
a shift collar provided on said input shaft to selectively engage with said at least one driver pulley, such that said at least one driver pulley is driven by said input shaft,
wherein the belt drive system further comprises a fixed housing, wherein said at least one driver pulley is rotatably provided on said fixed housing.

While the system is preferably provided to allow selective engagement of a driven pulley with an output shaft of a belt drive system, it will be understood that the invention may also be used to provide for selective engagement of a driver pulley with a rotating input shaft of a belt drive system. In this case, it will be understood that a reference to a driven pulley or to an output shaft may, with regard to such an alternative configuration, equally apply for an embodiment directed to selective engagement of a driver pulley to an input shaft used to drive such a driver pulley.

It will be understood that the shaft may be a solid shaft or a drum or similar tubular element.

Preferably, said at least one pulley is rotatably provided on said fixed housing using bearings. The bearings are provided such that said bearings are dynamically loaded when said shift collar is engaged with said at least one driven pulley to drive said output shaft, or when the input shaft is engaged to drive said at least one driver pulley.

As the pulley is provided on the fixed housing using a set of bearings, the bearings will continually experience dynamic loading, i.e. rotation, due to the relative movement between the rotating pulley and the fixed housing. Accordingly, false brinelling due to static loading of the bearings during shaft rotation is prevented.

It will be understood that the shift collar is disengageable from said at least one driven pulley, to remove drive from said shaft. In an alternative aspect, it will be further understood that the shift collar is disengageable from said at least one driver pulley, to remove drive from the driver pulley from the input shaft.

Preferably, said at least one pulley is concentric with the shaft.

Preferably, at least a portion of the said shaft is arranged within the fixed housing.

Preferably, the fixed housing comprises a tubular portion arranged concentric with said shaft.

It will be understood that the shaft may be provided as a cantilevered element, or may be supported at both ends of the shaft.

Preferably, at least a portion of the shaft is supported by the fixed housing. Preferably, said shaft is supported by at least one series of shaft bearings provided in said fixed housing.

The use of shaft bearings allows for the shaft to be closely supported by the housing, and to allow for the shaft to rotate about an axis within the fixed housing. The housing defines a tubular channel, wherein at least a portion of the shaft is received within the tubular channel and is free to rotate about an axis within the channel.

Preferably, the fixed housing comprises a first fixed end and a second free end, the first fixed end arranged to be secured to a fixed frame of a vehicle, wherein said shaft extends through the fixed housing and projects from said second free end of the fixed housing.

Preferably, the fixed housing comprises a flared section at said first fixed end, arranged to be mounted to a fixed frame. The flared section is arranged to be concentric with said shaft.

The flared section allows the fixed housing to be easily attached to a fixed frame of a vehicle, and additionally provides for an even distribution of loading from the fixed housing and any supported elements to the vehicle frame. The flared section is preferably provided as a frustoconical section.

Preferably, said at least one pulley is provided on said fixed housing at said second free end of said housing.

Preferably, the shift collar is moveable on said shaft between at least one engaged position wherein the shift collar is engaged with said at least one pulley, and a neutral position, wherein the shift collar is not engaged with said at least one pulley.

Preferably, the shift collar is arranged to be moveable on said shaft along a portion of the length of said shaft. Preferably, the shaft and the shift collar comprise elements cooperatively engageable to connect the shift collar to the shaft for cooperative rotation of the shaft and the shift collar. It will be understood that the elements may comprise any suitable mating features, e.g. a lug style coupler.

Preferably, such elements on the shaft and the shift collar comprise mating splines.

Preferably, the mating splines are provided on an internal surface of the shift collar.

Preferably, the shaft and the at least one pulley comprise elements cooperatively engageable to connect the at least one pulley to the shift collar when the shift collar is in said at least one engaged position, for rotation of the shift collar by the at least one pulley. It will be understood that the elements may comprise any suitable mating features, e.g. a lug style coupler.

Preferably, the shift collar comprises external splines arranged to couple with engagement splines provided on the at least one pulley.

Preferably, the shift collar comprises a detent mechanism to selectively hold the shift collar in place on said shaft.

The detent mechanism is arranged to hold the shift collar in place when the shift collar is in the at least one engaged position or in the neutral position.

In one embodiment, the detent mechanism comprises at least one garter spring retained in said shift collar, the garter spring arranged to couple with at least one groove provided on the surface of said shaft. Alternatively, the detent mechanism may comprise any combination of a spring bias, a detent ball, a rubber ring, etc., which is arranged to be cooperatively engageable with the shaft to retain the shift collar in place on the shaft for the at least one engaged position or the neutral position.

Preferably, the belt drive system comprises at least one driver pulley coupled to said at least one driven pulley via a drive belt.

In a preferred embodiment, the belt drive system comprises:
a first pulley; and
a second pulley,
said first pulley rotatably provided on said fixed housing using first bearings,
said second pulley rotatably provided on said first pulley using second bearings,
wherein said shift collar is selectively engageable with said first pulley or said second pulley to engage the pulley with the shaft.

In one aspect, the first and second pulleys are provided as driven pulleys to be arranged coaxial with an output shaft, wherein a shift collar is selectively engageable with the first driven pulley or the second driven pulley to drive the output shaft. In an additional or alternative aspect, the first and second pulleys are provided as driver pulleys to be arranged coaxial with an input shaft, wherein a shift collar is selectively engageable with the first driver pulley or the second driver pulley to be driven by the input shaft.

The system is arranged such that the first and second bearings are dynamically loaded when the first and second pulleys are rotated, regardless of shift collar engagement with the first or second pulleys. It will be understood that the first and second bearings may be dynamically loaded during rotation of the first pulley only.

It will be further understood that the first pulley and the second pulley are arranged to rotate at different speeds, ensuring that the first and second bearings will be dynamically loaded, or rotating, for all conditions when the pulleys are driven. The pulleys may be provided in different dimensions, or may be driven at different speeds from separate driver pulleys, or a combination thereof.

Additional driver or driven pulleys may be provided to be selectively engageable with an appropriate shift collar. In this case, the additional pulleys may be rotatably provided on the fixed housing, or on the first, second, or any other additional pulley. Accordingly, a series of multiple pulleys may be provided, wherein the interface of each pulley is dynamically loaded for all stages of pulley rotation, for example to prevent false brinelling of pulley bearings.

Preferably, said first pulley comprises a mounting flange arranged about and substantially concentric with said shaft, wherein said second pulley is rotatably provided on said mounting flange.

The mounting flange provides an extension of the first pulley to which the second pulley can be easily mounted. Preferably, the mounting flange extends from the first pulley in a direction substantially parallel to the axis of rotation of the shaft.

Preferably, said mounting flange is arranged about and substantially concentric with a portion of said fixed housing, wherein said mounting flange is rotatably supported by the portion of said fixed housing, e.g. using at least one set of bearings.

By providing a rotating coupling between the mounting flange and the fixed housing, the load of the second pulley can be easily transferred through the mounting flange to the underlying supporting housing.

Preferably, the shift collar is moveable between:
a first engaged position, wherein the shift collar is engaged with the first pulley;
a second engaged position, wherein the shift collar is engaged with the second pulley; and a neutral position, wherein the shift collar is disengaged from both the first and second pulleys.

Preferably, the shift collar is provided with external splines, wherein the said external splines are arranged to couple with first mating splines provided on the first pulley when the shift collar is in said first engaged position, and said external splines are arranged to couple with second mating splines provided on the second pulley when the shift collar is in said second engaged position.

In one aspect, the first mating splines are provided on a mounting flange of the first pulley. Preferably, the first mating splines are formed integrally with the mounting flange.

In a preferred aspect, the first mating splines are provided on a first mounting plate secured to a mounting flange of the first pulley. Preferably, the first mounting plate abuts said second bearings when secured to the mounting flange, such that the first mounting plate acts to at least partly secure said second bearings in place on said first pulley.

In an additional or alternative aspect, the second mating splines are provided on a second mounting plate secured to the second pulley.

The use of a separate plate which can be coupled to the second pulley allows for ease of assembly of the system, allowing for components of the system to be built up in stages from one side of the system.

There is also provided a vehicle, preferably a harvester, comprising a belt drive system as described above.

Preferably, the belt drive system is arranged as part of a material handling system of a harvester.

BRIEF DESCRIPTION OF THE DRAWINGS

Embodiments of the invention will now be described, by way of example only, with reference to the accompanying drawings, in which.

DETAILED DESCRIPTION OF THE INVENTION

Figure 1:
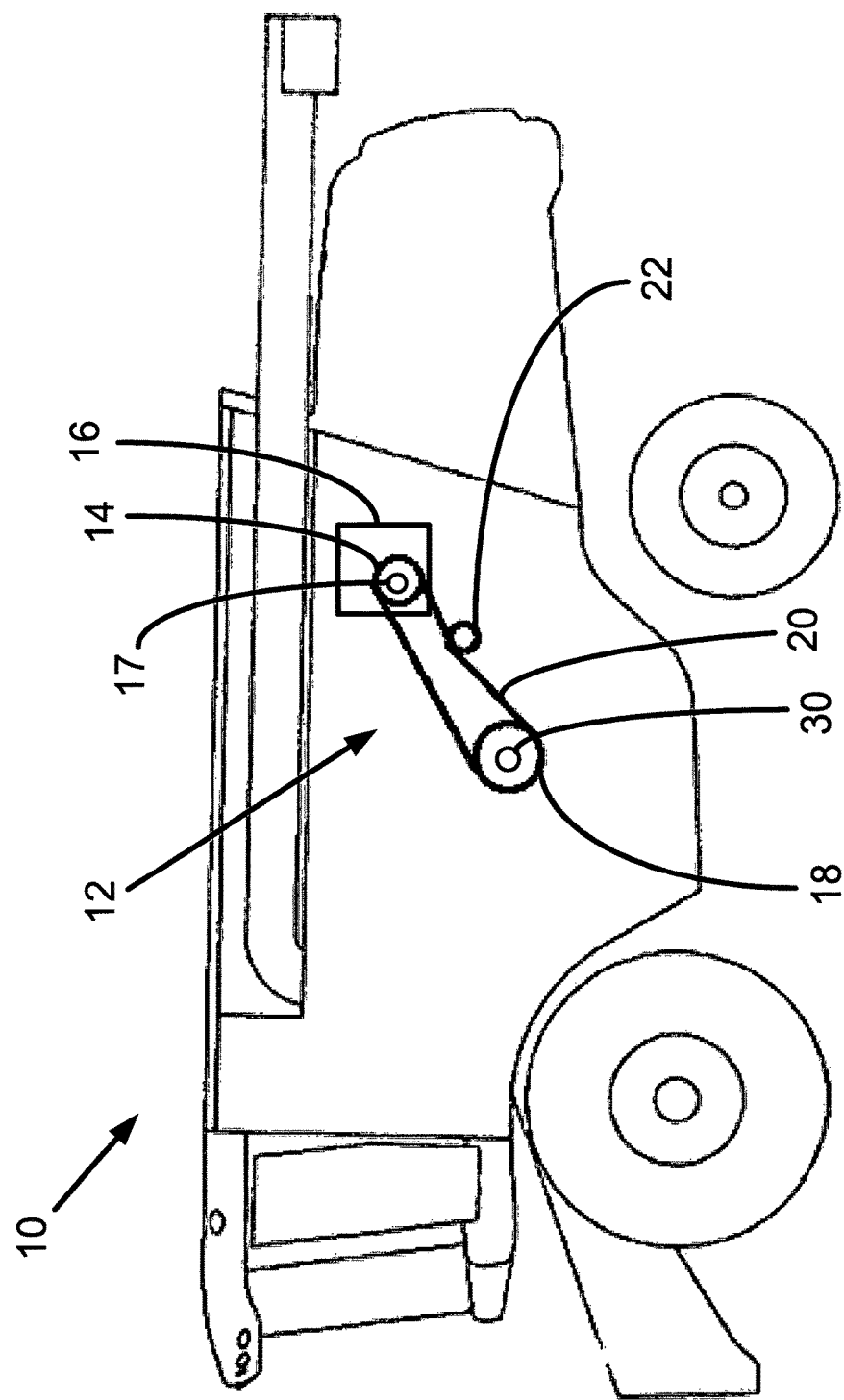
FIG. 1 is a representative side view of a combine harvester having a belt drive system according to the invention.

FIG. 1 shows an agricultural vehicle in the form of a combine harvester 10. The harvester 10 is provided with a belt drive system 12 for use in a material handling system of the harvester 10. The belt drive system 12 comprises a driver pulley 14 which is rotated by a connected drive system 16. The drive system 16 rotates an input driver shaft 17, to which the driver pulley 14 is mounted. The driver pulley 14 is coupled with a driven pulley 18 via an endless belt 20 which is provided around the pulleys 14,18. A belt tensioner 22 is provided in contact with the belt 20 to ensure the belt 20 is maintained in position on the pulleys 14,18 during use. The driven pulley 18 is rotated under action of the driver pulley 14, and is used to provide rotation to suitable components of the harvester 10. For example, the driven pulley 18 may be coupled with a rotary chopper, a conveyor, an auger, an impeller, a rotary drum, etc. The belt drive system 12 may comprise a single set of belt-coupled driver and driven pulleys, or the system may comprise a plurality of different pulley sets to provide for multiple speed operation.

Figure 2:
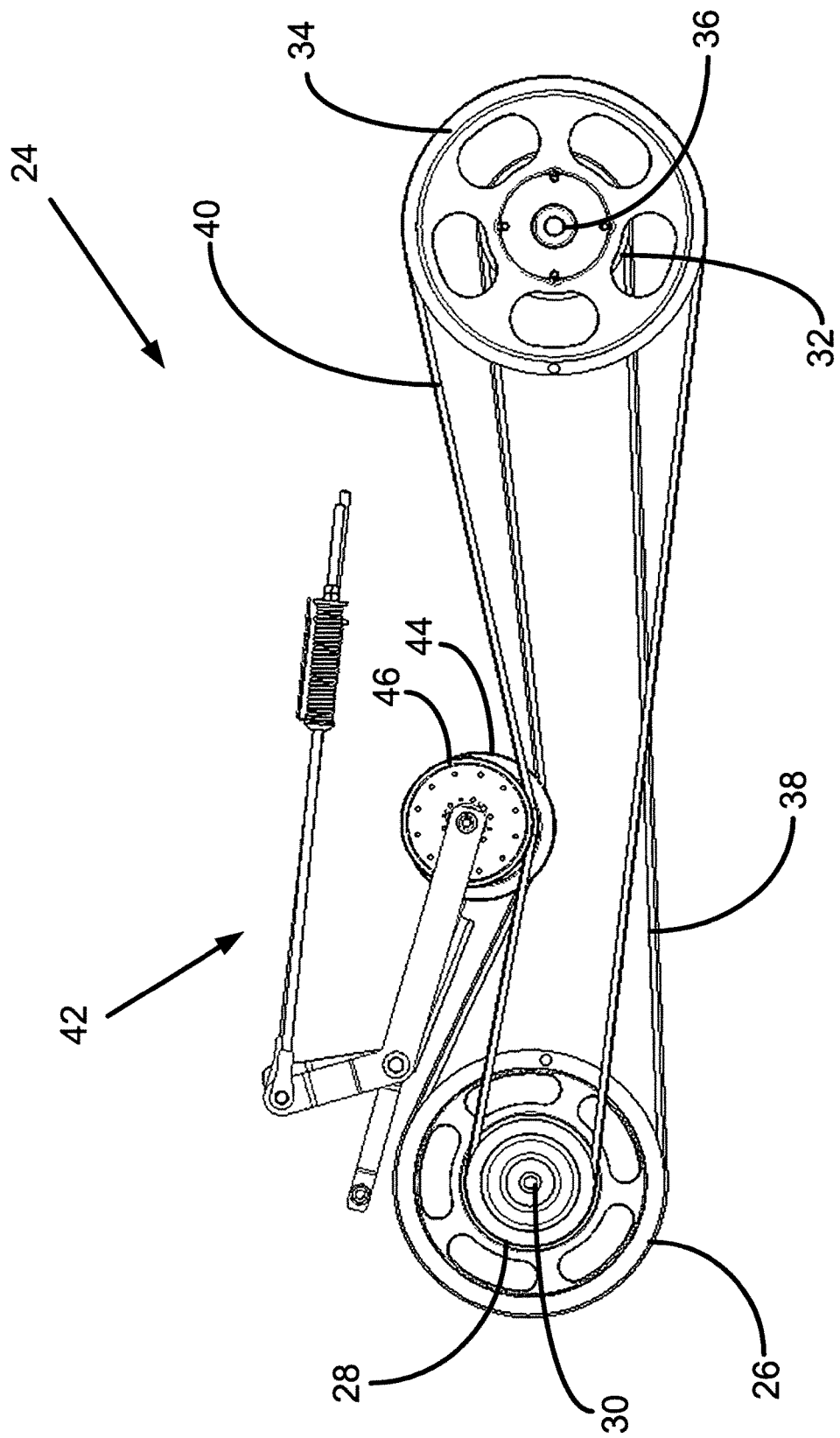
FIG. 2 is an enlarged side view of a belt drive system according to the invention.

An enlarged view of a two-speed belt drive system 24 according to an aspect of the invention is shown in FIG. 2. In this embodiment, the belt drive system 24 comprises a first driver pulley 26 and a second driver pulley 28. The driver pulleys 26,28 are provided on and concentric with a common rotating shaft 30 which is coupled with a suitable drive system (not shown). The belt drive system 24 further comprises a first driven pulley 32 and a second driven pulley 34 which are arranged to be concentric with a suitable output shaft 36. It will be understood that the output shaft may be a solid shaft, a tubular shaft, or any suitable drum or roller.

The first driver pulley 26 is coupled with the first driven pulley 32 using a first endless belt 38, provided around the pulleys 26,32. The second driver pulley 28 is coupled with the second driven pulley 34 using a second endless belt 40, provided around the pulleys 28,34. The belt drive system 24 is provided with a belt tensioner apparatus 42, which is arranged to apply belt tensioners 44,46 against the respective first and second belts 38,40 to tension and maintain the belts in position on the pulleys 26,28,32,34. It will be understood that the first and second driven pulleys 32,34 are arranged to be driven at different rotational speeds.

Figure 3:
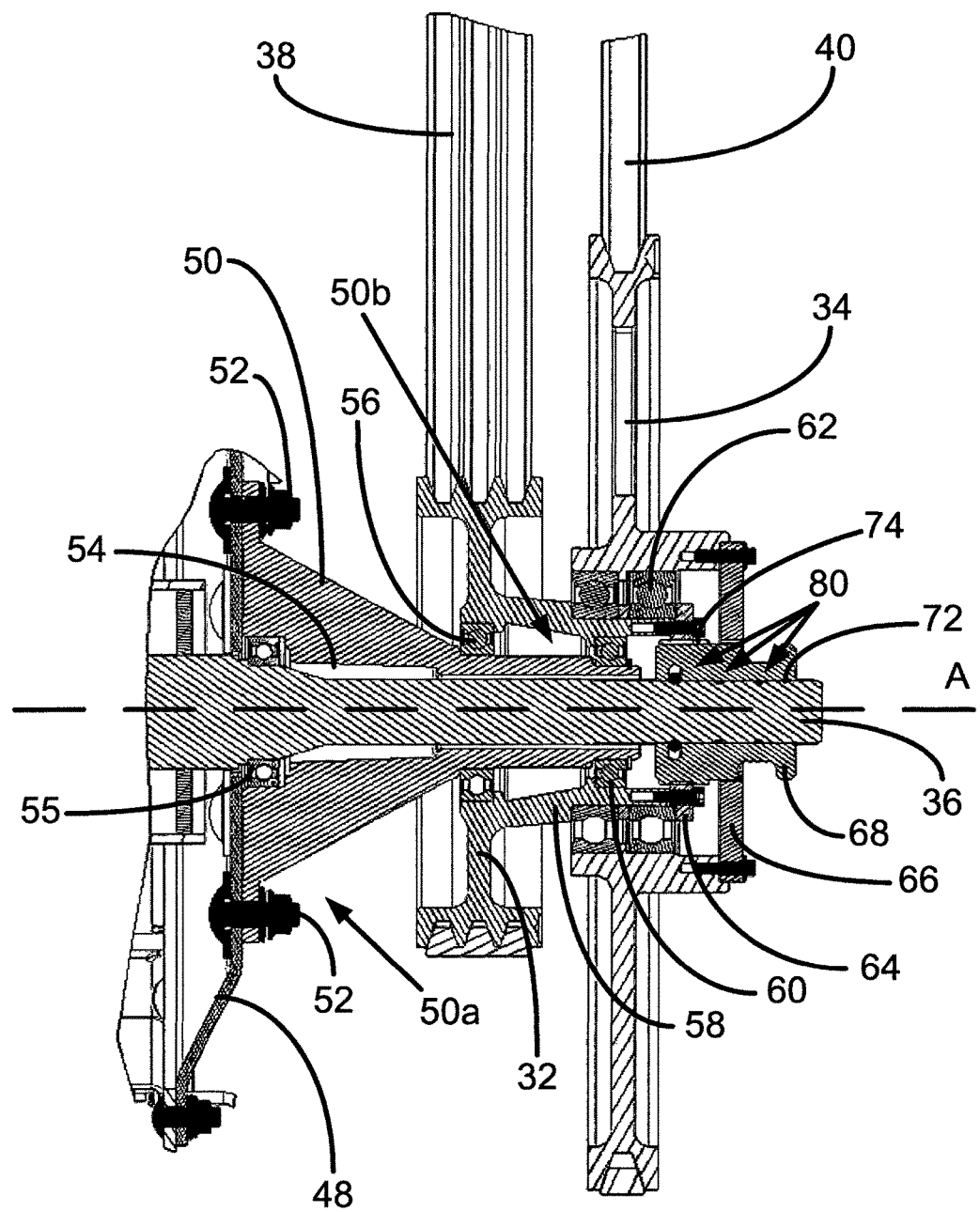
FIGS. 3-5 show cross-sectional views of a portion of a belt drive system according to the invention in first, second, and third states.
Figure 4:
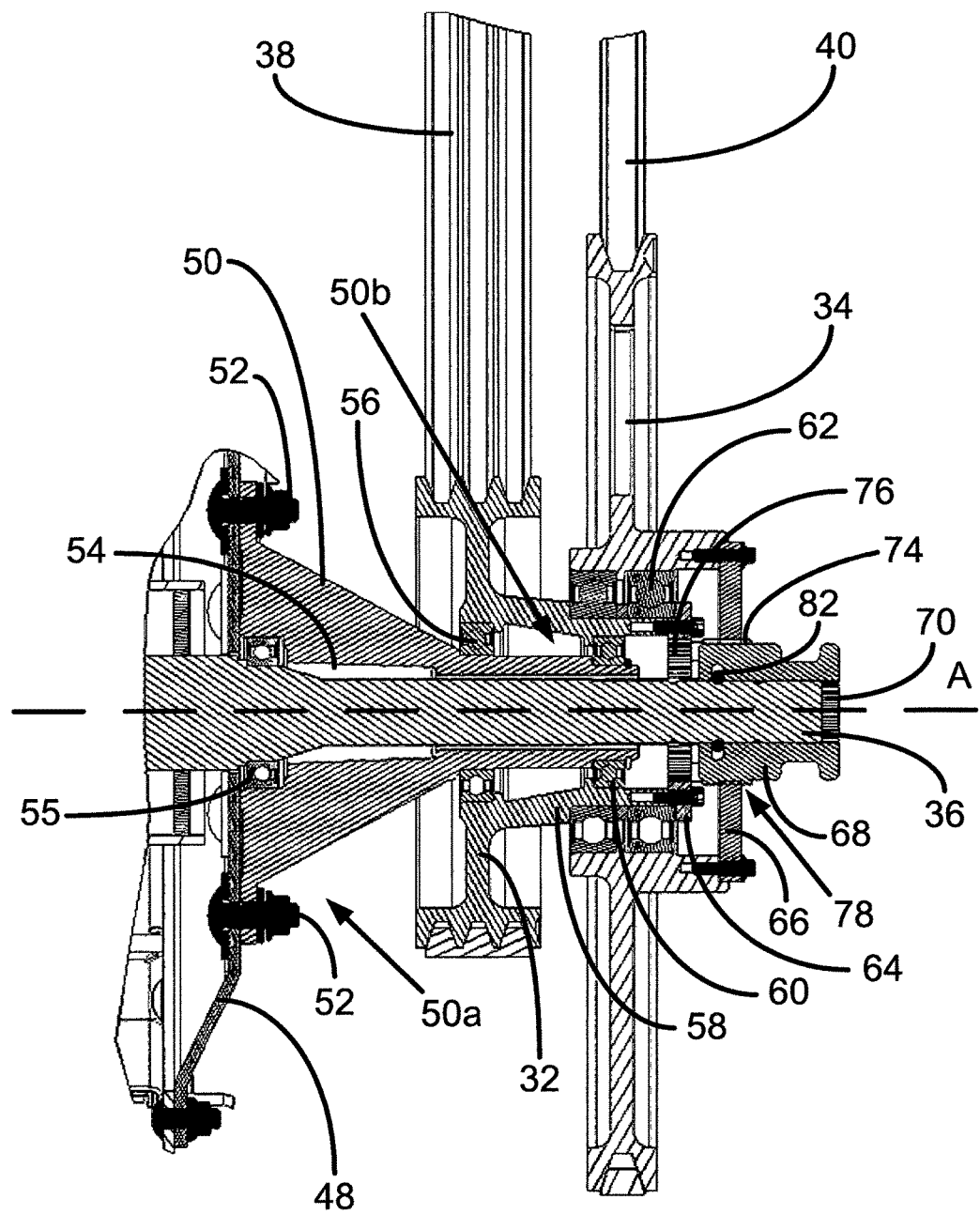
Figure 5:
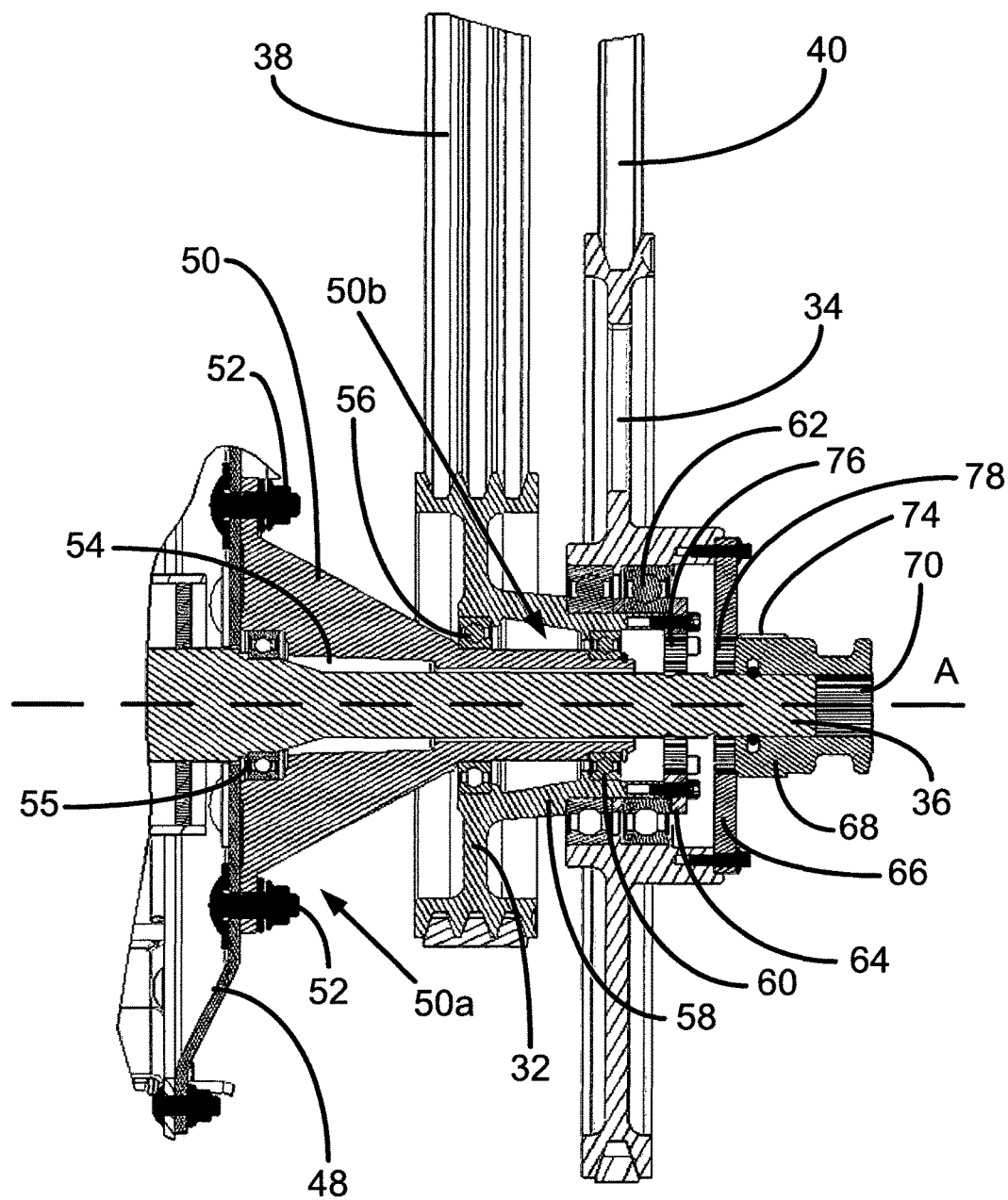

FIGS. 3-5 illustrate a series of cross-sectional views of a section of the belt drive system 24 of FIG. 2, taken through the first and second driven pulleys 32,34 along a portion of the length of the shaft 36. The shaft 36 extends through a portion of a fixed frame 48 of a vehicle and is free to rotate about axis A. As described above in reference to FIG. 1, the shaft 36 is arranged to be coupled with a component to be rotated (not shown) in the vehicle, e.g. a rotary chopper, a conveyor, an auger, an impeller, a rotary drum, etc.

A fixed housing 50 is attached to the fixed frame 48. The fixed housing 50 is bolted to the fixed frame 48 at a first end 50a of the housing 50 using bolts 52 or any other suitable attachment elements, the fixed housing 50 projecting from the fixed frame 48 to a second free end 50b. The fixed housing 50 defines an internal channel 54 extending from the first end 50a to the second end 50b through which the shaft 36 extends. The shaft 36 is supported by shaft bearings 55 provided within the fixed housing 50. While the illustrated embodiments show a single set of bearings 55 provided in the channel 54, it will be understood that the shaft 36 may be supported by multiple separate bearings within the channel 54.

The fixed housing 50 comprises a tapered or frustoconical profile at the first end 50a of the housing 50, to allow for ease of attachment of the housing 50 to the frame 48, and also to allow for more event distribution of load forces from the housing 50 to the attached frame 48. The fixed housing 50 further comprises a generally tubular profile at the second end 50b of the housing 50.

The first driven pulley 32 is rotatably mounted on the second end 50b of the fixed housing 50, and is arranged concentric with and rotatable around axis A. The first driven pulley 32 is supported on first bearings 56 positioned at the tubular portion of the second end 50b of the fixed housing 50. The first driven pulley 32 further comprises a mounting flange or collar 58 which projects from a surface of the pulley 32 in a direction substantially parallel to the tubular portion of the second end 50b of the fixed housing 50, away from the fixed frame 48. The mounting flange 58 is rotatably supported on the fixed housing 50 by the first bearings 56 and additionally at the second end 50b of the housing 50 using a set of flange bearings 60.

The second driven pulley 34 is rotatably mounted on the mounting flange 58 of the first driven pulley 32, and is arranged concentric with and rotatable around axis A. The second driven pulley 34 is supported on second bearings 62 positioned on the mounting flange 58 of the first driven pulley 32.

A first mounting plate 64 in the form of a circular plate having a central aperture is secured to a free end of the mounting flange 58, concentric with the axis A. The first mounting plate 64 is arranged such that a portion of the mounting plate 64 abuts a portion of the second bearings 62. Accordingly, the first mounting plate 64 acts to hold the second bearing 62 in place on the mounting flange 58. In addition, a second mounting plate 66 in the form of a circular plate having a central aperture is secured to the second driven pulley 34, concentric with the axis A. The shaft 36 is arrange to extend through the central apertures of the first and second mounting plates 64,66.

A shift collar 68 is provided on the shaft 36. The shift collar 68 is moveable along a portion of the length of the shaft 36, parallel to axis A. It will be understood that the position of the shift collar 68 is adjusted along the length of the shaft 36 using any suitable system, e.g. a suitable actuator connected to the shift collar 68. It will be understood that the adjustment of the location of the shift collar 68 may be controlled from an electronic control unit (ECU) arranged to control operation of the system, based on received inputs e.g. control inputs, sensor readings, etc., The adjustment may also be performed by way of a manual actuation of the shift collar 68 along the length of the shaft 36, e.g. using an appropriate operator control level coupled with the shift collar 68.

The shift collar 68 is provided with internal splines (70, FIGS. 4 & 5) arranged on an internal surface of the shift collar 68, the internal splines 70 arranged to couple with shaft splines (72, FIG. 3) provided on the surface of the shaft 36, such that the shift collar 68 is coupled with the shaft 36. The shift collar 68 further comprises external splines 74 provided on an external surface of the shift collar 68. While the embodiment illustrated comprises internal and external mating splines, it will be understood that any suitable coupling system may be use which can provide for suitable torque transfer between the components of the system.

The movement of the shift collar 68 allows for the shaft 36 to be selectively driven by either the first or the second driven pulley 32,34, or to be placed into a neutral condition.

In FIG. 3, the shift collar 68 is arranged in a first engaged position, wherein the external splines 74 of the shift collar 68 are arranged to couple with first mating splines (76, FIGS. 4 & 5) provided on the first mounting plate 64. In this position, the shift collar 68 is coupled with the first driven pulley 32, such that the shaft 36 is rotated at the speed of rotation of the first driven pulley 32.

In FIG. 4, the shift collar 68 is moved along the shaft 36 in a direction away from the fixed frame 48, such that the external splines 74 of the shift collar 68 are disengaged from the first mating splines 76 of the first mounting plate 64. The shift collar 68 is brought to a second engaged position, wherein the external splines 74 of the shift collar 68 are arranged to couple with second mating splines (78, FIGS. 4 & 5) provided on the second mounting plate 66. In this position, the shift collar 68 is coupled with the second driven pulley 34, such that the shaft 36 is rotated at the speed of rotation of the second driven pulley 34.

In FIG. 5, the shift collar 68 is moved further along the shaft 36 such that the external splines 74 of the shift collar 68 are disengaged from the second mating splines 78 of the second mounting plate 66. The shift collar 68 is brought to a neutral position, wherein the external splines 74 of the shift collar 68 are disengaged from the first and second driven pulleys 32,34. Accordingly, the shaft 36 is un-driven by the pulleys 32,34, and shaft rotation may freewheel or be braked to a stop.

The system further comprises a detent mechanism in the form of a series of circumferential grooves (indicated at 80, FIG. 3) defined in the surface of the shaft 36, the grooves 80 corresponding to the locating of the shift collar 68 in place in one of the said first and second engaged positions or the neutral position. The grooves 80 may be provided to have any suitable cross-sectional shape, e.g. a V-shaped groove. A bias element (82, FIG. 4) is positioned in a channel defined in the internal surface of the shift collar 68, wherein the bias element 82 is partly received in one of the circumferential grooves 80 as the shift collar 68 is moved along the shaft 36, to releasably retain the shift collar 68 in one of the above-mentioned positions.

The bias element 82 may comprise any element suitable of releasably retaining the shift collar 68 in place on the shaft 36, e.g. at least one garter spring or other spring bias, a detent ball, a rubber ring, etc.

By providing the driven pulleys 32,34 as rotatably mounted directly to the fixed housing 50, or indirectly mounted to the fixed housing 50 via a mounting flange 58 of another pulley, the pulleys 32,34 are not mounted to the shaft 36 to which they are selectively engaged. Accordingly, the mounting interface of the pulleys 32,34, and in particular the bearings 56,60 used to mount the pulleys 32,34, are dynamically loaded (i.e. rotating) for all conditions of rotation of the pulleys 32,34, regardless of the engagement of the pulleys 32,34 with the shaft 36. This eliminates the effects of static loading on the bearings 56,60 during use of the system, preventing fatigue damage or failure of the bearings 56,60 due to false brinelling.

It will be understood that the invention may equally apply for the selective engagement of at least one driver pulley 14 with an input shaft 17, to allow for selective engagement of the at least one driver pulley 14 by the shaft 17 while ensuring dynamic loading of bearings used to support the driver pulley 14 on the shaft 17. In this case, it will be understood that the features of the embodiment as described above for the selective engagement of the driven pulley with the shaft may also be used for an embodiment having selective engagement of a driver pulley on a rotating input shaft, mutatis mutandis.

In addition, while the embodiment shown in FIGS. 2-5 illustrates a two-speed belt driven system, it will be understood that the invention may also apply for single-belt systems, to prevent false brinelling of the bearings of such systems. Additionally, the invention may apply to belt-driven systems having more than two belts, wherein additional driven pulleys are provided to be selectively engageable with the shift collar. In this case, the additional driven pulleys may be rotatably provided on the fixed housing, or on the first, second, or any other additional driven pulley.

The invention is not limited to the embodiments described herein, and may be modified or adapted without departing from the scope of the present invention.

The invention claimed is:

1. A belt drive system for a vehicle, the belt drive system comprising:
    a fixed housing;
    a first pulley, said first pulley rotatably provided on said fixed housing using first bearings;
    a second pulley, said second pulley rotatably provided on said first pulley using second bearings;
    a shaft rotatable about an axis; and a shift collar provided on said shaft, wherein said shift collar is selectively engageable with said first pulley or said second pulley to engage said first pulley or said second pulley with the shaft such that said first pulley or said second pulley is drivably engaged with said shaft;

wherein said first pulley comprises a mounting flange arranged about and substantially concentric with the shaft, wherein said second pulley is rotatably provided on said mounting flange.

2. The belt drive system of claim 1, wherein the fixed housing comprises a first fixed end and a second free end, the first fixed end arranged to be secured to a fixed frame of a vehicle, wherein said shaft extends through the fixed housing and projects from said second free end of the fixed housing.

3. The belt drive system of claim 2, wherein the fixed housing comprises a flared section at said first fixed end, arranged to be mounted to a fixed frame.

4. The belt drive system of claim 2, wherein said first pulley is provided on said fixed housing at said second free end of said housing.

5. The belt drive system of claim 1, wherein the shift collar is moveable on the shaft between at least one engaged position wherein the shift collar is engaged with said first pulley, and a neutral position, wherein the shift collar is not engaged with first pulley.

6. The belt drive system of claim 1, wherein the shaft and the shift collar comprise elements cooperatively engageable to connect the shift collar to the shaft, for cooperative rotation of the shaft and the shift collar.

7. The belt drive system of claim 1, wherein the shaft and the first pulley comprise elements cooperatively engageable to connect the first pulley to the shift collar, for rotation of the shift collar with the first one pulley.

8. The belt drive system of claim 7, wherein the shift collar comprises external splines arranged to couple with engagement splines provided on the first pulley.

9. The belt drive system of claim 1, wherein the shift collar comprises a detent mechanism to selectively hold the shift collar in place on the shaft.

10. The belt drive system of claim 1, wherein the shift collar is moveable between:
- a first engaged position, wherein the shift collar is engaged with the first pulley;
- a second engaged position, wherein the shift collar is engaged with the second pulley; and
- a neutral position, wherein the shift collar is disengaged from both the first and second pulleys.

11. A belt drive system for a vehicle, the belt drive system comprising:
- a fixed housing;
- a first pulley, said first pulley rotatably provided on said fixed housing using first bearings;
- a second pulley, said second pulley rotatably provided on said first pulley using second bearings;
- a shaft rotatable about an axis; and
- a shift collar provided on said shaft, wherein said shift collar is selectively moveable between:
  - a first engaged position, wherein the shift collar is engaged with the first pulley;
  - a second engaged position, wherein the shift collar is engaged with the second pulley; and
  - a neutral position, wherein the shift collar is disengaged from both the first and second pulleys;
  - wherein the shift collar is provided with external splines, wherein the said external splines are arranged to couple with first mating splines provided on the first pulley when the shift collar is in said first engaged position, and said external splines are arranged to couple with second mating splines provided on the second pulley when the shift collar is in said second engaged position.

12. A vehicle comprising a belt drive system as claimed in claim 1.

* * * * *